United States Patent [19]

Faroudja

[11] 4,262,304
[45] Apr. 14, 1981

[54] LOW LEVEL/SIGNAL BOOSTER FOR TELEVISION TRANSITION

[76] Inventor: Yves C. Faroudja, 26595 Anacapa Dr., Los Altos Hills, Calif. 94022

[21] Appl. No.: 57,701
[22] Filed: Jul. 16, 1979.
[51] Int. Cl.³ .............................................. H04N 5/14
[52] U.S. Cl. ...................................... 358/37; 358/166
[58] Field of Search .......................... 358/37, 166, 162

[56] References Cited

U.S. PATENT DOCUMENTS 4,075,661  2/1978  Heffron ................................ 358/166

*Primary Examiner*—Robert L. Richardson
*Attorney, Agent, or Firm*—David B. Harrison

[57] ABSTRACT

A low level television transition signal booster offsets low level video transitions by a predetermined amplitude pedestal prior to the passage of the video through a path in a television system characterized by the unwanted loss of small detail information in order to correct in advance this expected loss of details. The low level signal booster includes a linear signal main path from an input to an output and a low level signal expansion circuit connected in parallel to the linear signal path which generates and adds a nonlinear signal complement which when combined in proper time relationship with a low level video transition signal below a predetermined value increases the instantaneous amplitude thereof generally by the amount corresponding to the pedestal. The signal complement is generated from the low level video transition signal, yet it is not generated for any video transition signals lying above the predetermined value. The invention embraces a low level transition signal booster system which operates either in one dimension only or simultaneously in the horizontal and vertical dimensions.

10 Claims, 7 Drawing Figures

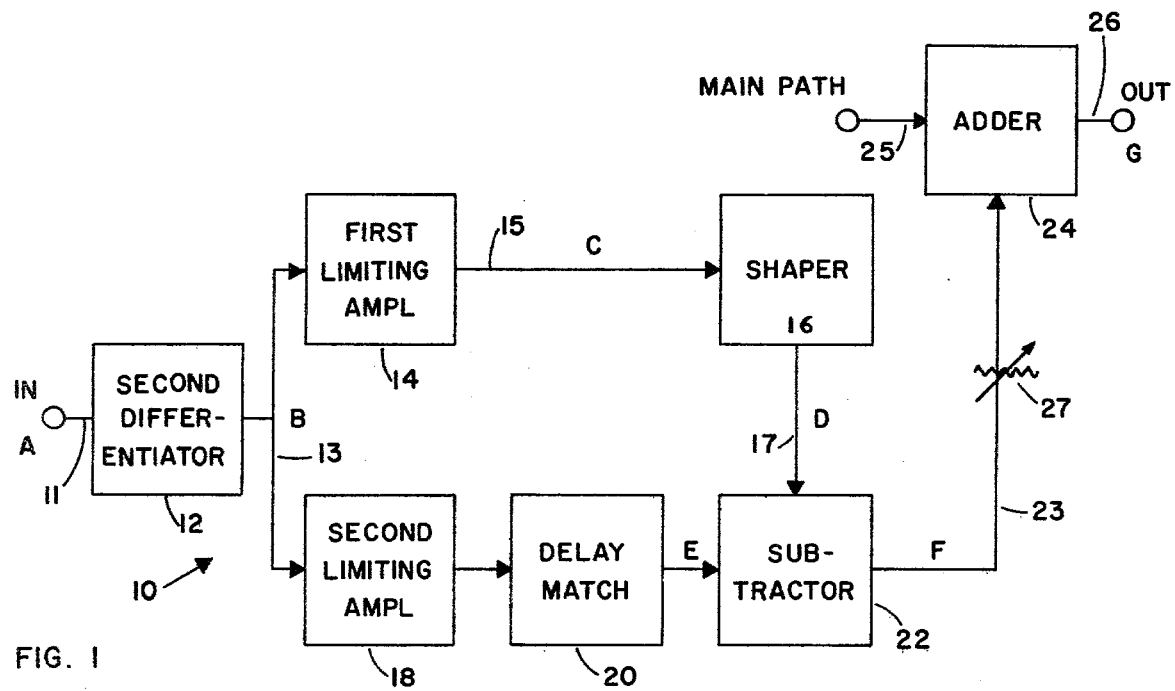
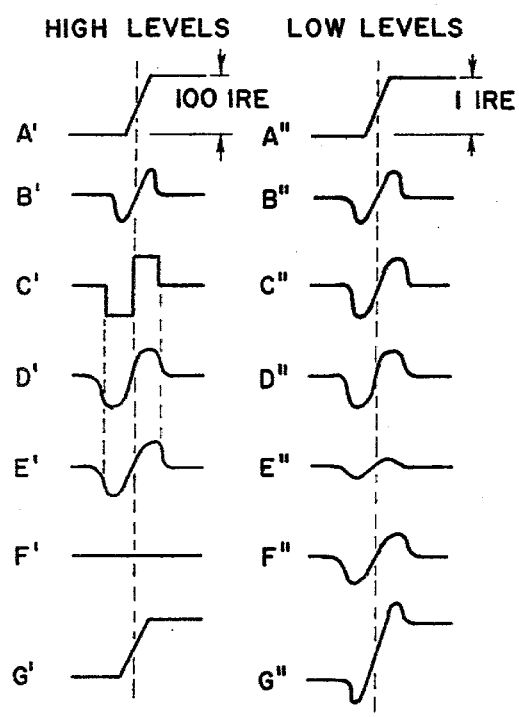
FIG. 2
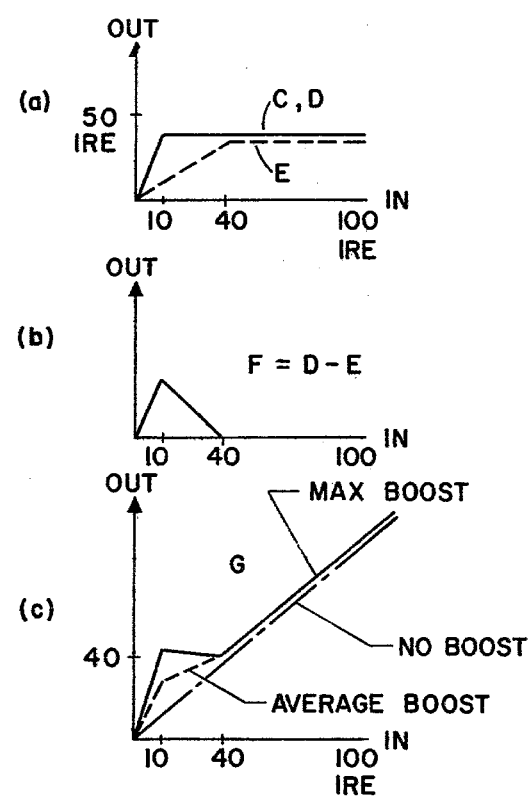
FIG. 3

LOW LEVEL/SIGNAL BOOSTER FOR TELEVISION TRANSITION

BACKGROUND OF THE INVENTION

The present invention relates to nonlinear processing of television signals, and more particularly, the present invention relates to nonlinear processing of low level television transition signals prior to passage through a medium subject to loss of the low level transition signals.

Recently introduced low-cost, consumer type video recorders are particularly sensitive to loss of picture details. These recorders, which have become widespread because of their low cost and light weight, suffer from bandwidth limitation as well as high noise and interference levels. In order to reduce objectionably high noise and levels, manufacturers introduced in the playback path a threshold circuitry which functioned as follows: High and low frequencies of the video signal were separated. The low frequencies were transmitted without modification. The high frequencies were then submitted to a threshold circuitry which allowed the signal to pass through only when above a predetermined value and were then recombined with the low frequencies to reconstitute the original video signal with a lower level of interference and noise. Unfortunately, the main drawback of that technique is a reduction or even a total elimination of desirable low level transitions. High level transitions are not modified. The result is a noise-free, interference free picture which is subjectively impaired: edges (large transitions) are readily quite visible, while fine picture details have completely disappeared. The resulting picture is objectionably too "cartoon"-like or "pasty-looking". Such picture defects cannot be corrected in playback since lost transitions cannot be recovered. Yet, before the present invention, limitations of the prior art technique of high frequency playback threshold would otherwise reestablish noise and interference at unacceptable levels.

Non-linear, level dependent manipulation techniques for television signals are not novel and have formed the subject matter of many prior patents. In general, such prior art disclosures described symmetrical systems having complementary effects on the input and output signals of a noisy or lossy medium; those systems consisted of two sections which could not operate separately. A number of prior approaches have been proposed for such symmetrical systems, including the provision of variable preemphasis, as shown in U.S. Pat. Nos. 3,117,278 and 3,207,854 to Johnson. A television broadcasting scheme including pretransmission preemphasis, and post reception deemphasis is set forth in U.S. Pat. No.3,286,024 to Melchior; that system followed classic preemphasis philosophy by preemphasizing the higher frequencies of the signal. One inventor, Ray Milton Dolby, has been active for a number of years in the area of noise reduction in communications systems, particularly audio recording. In one of his patents, U.S. Pat. No. 3,875,537, Dolby suggests the use of a threshold below which low level signals are provided with nonlinear processing, and above which signals are processed linearly. While Dolby made general reference to the suitability of video applications to nonlinear processors such as he described, he did not describe specific implementation of circuit architecture which could be utilized only prior to recording or transmission through a noisy and lossy medium, and which would result into an improved quality without further modification of the recording or transmitting device.

SUMMARY OF THE INVENTION

An object of the present invention is to provide a system to establish low level transitions (and only low level transitions) on an artificially generated pedestal for increasing detail levels prior to recording or transmitting through a medium subject to loss of low level transitions, in order to compensate in advance for this expected loss.

Another object of the present invention is to provide a low level television signal booster for processing low level television signals to improve picture quality and eliminate subjective picture "flatness."

Another object of the present invention is to provide a low level signal booster for use in television systems which is compatible with existing receiving equipment and requires no special equipment at the receiving end.

Another object of the present invention is to provide a low level signal booster which is particularly useful in video recording or transmitting schemes.

A further object of the present invention is to provide a low level signal booster which introduces a minimum of visible distortion artifacts into the television picture while enabling substantial improvement in picture quality.

A still further object of the present invention is the provision of an adaptive low level signal booster which operates selectively to modify low level signal components, yet which is inoperative in connection with high level signal components above a predetermined amplitude level.

Yet another object of the present invention is to provide an adaptive low level transition signal booster system which operates in the horizontal dimension, in the vertical dimension, or simultaneously in the horizontal and vertical dimensions.

The low level transition signal booster of the present invention offsets low level video transitions by a predetermined amplitude pedestal before the video passes through a path in a television system. The signal booster provides a linear signal path to which it adds a nonlinear signal complement. The nonlinear signal complement is generated from low level video transitions in the path in a way in which the low level transitions are offset by an amount corresponding to the pedestal so that subsequent system filtering processes do not remove the offset low level transition signals, and they appear as fine picture details in the reproduced television picture. The signal booster operates only in connection with low level transition signals, and it is switched out of the linear signal path for video signals initially above a predetermined amplitude.

The processing technique and apparatus of the present invention may be applied separately to low level transition signals in the horizontal dimension or in the vertical dimension, with little change other than accommodation of the different typical transition times and bandwidth requirements in each domain. In one aspect of the present invention, low level transition signal boosting occurs simultaneously in the horizontal and vertical dimensions.

In accordance with the present invention, the video signal at the output of the lossy medium will show frequency response and transitional rise time which are independent of the transition level and will provide picture image free of low level detail losses.

The foregoing objects, advantages and features of the present invention will become even more apparent from a consideration of the following detailed description of a preferred embodiment of the invention, presented with the accompanying drawings.

BRIEF DESCRIPTION OF THE DRAWINGS

In the drawings:

FIG. 1 is a block diagram of a low level television signal booster in accordance with the principles of the present invention.

FIG. 2 is a pair of waveform diagram sets at selected points in the system set forth in FIG. 1.

FIG. 3 is a series of graphs of transfer characteristics of various elements of the system set forth in FIG. 1.

DETAILED DESCRIPTION OF PREFERRED EMBODIMENTS

Figure 4:
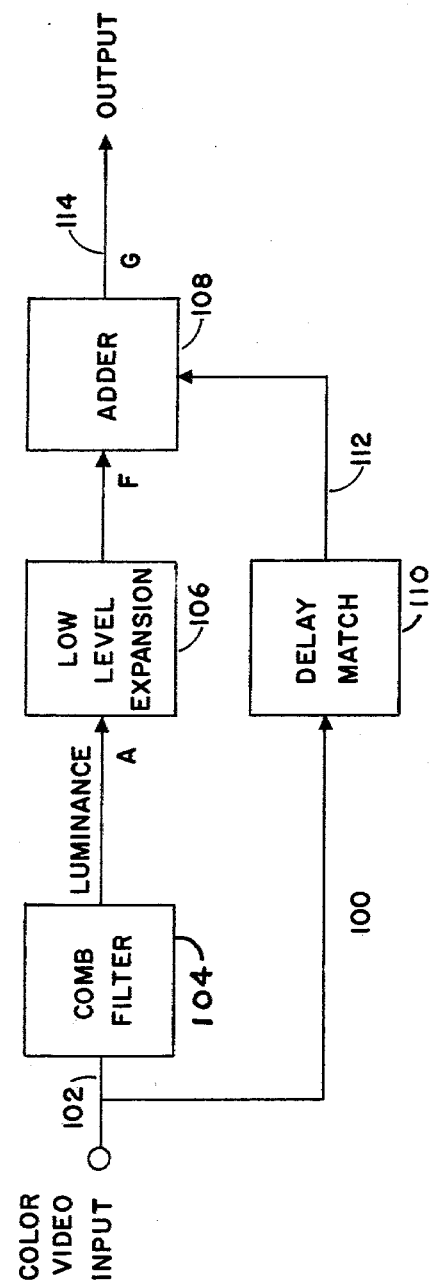
FIG. 4 is a block diagram of a low level color television signal booster in accordance with the principles of the present invention.

A low level horizontal transition booster 10 incorporating the principles of the present invention is set forth in FIG. 1. The FIG. 1 system may be adapted for boosting low level vertical transitions by substituting the elements found in FIG. 6 for some of the elements in FIG. 1 as will be explained hereinafter.

FIG. 2 sets forth two aligned sets of waveform drawings. Representative high level signals at various locations of the booster are illustrated in the left waveform set of FIG. 2 while corresponding representative low level signals at corresponding locations of the booster 10 are illustrated in the right waveform set of FIG. 2. The amplitude level of right waveform set is greatly exaggerated compared to the amplitude level of the left set, in order to provide meaningful comparative waveform comparison.

A video signal from an input 11 (such as a high level transition A' or low level transition A", (FIG. 2) is passed through a linear second differentiator 12 to provide a twice differentiated signal irrespective of amplitude on a line 13. This differentiated signal is shown as waveforms B' and B" in FIG. 2.

The output from the second differentiator 12 is applied via the line 13 to a first limiting amplifier 14 which functions to limit the second differential above a predetermined low level, typically 10 IRE units. For high level transition signals, such as shown by waveform C', the output of the first limiting amplifier 14 is essentially a squarewave. For low level transitions, below 10 IRE units, the output of the first limiting amplifier 14 tracks the input, as shown by waveform C" which is substantially symmetrical with waveform B". An output line 15 from the first limiting amplifier 14 is connected as an input to a wave shaping circuit 16. The circuit 16 alters the high level square wave (waveform C') into a sinusoidal signal (waveform D') by functioning as a low pass filter of a Gaussian nature characterized by no ringing or overshoot and flat frequency response within its bandpass. The cutoff point of the shaper circuit 16 is one-half to three quarters of the television system luminance bandwidth for horizontal transition processing. Essentially, the characteristics of the shaper 16 are that third harmonics in the signal passing therethrough are eliminated. Thus, waveform D' in FIG. 2 illustrates the sinusoidal shaping of the square wave C' in the case of high level signals. The shaper 16 is essentially nonresponsive to low level transitions, and its low level output (waveform D") essentially models its input (waveform C").

The linear second differentiated signal from the second differentiator 12 is also applied via the line 13 to a second limiting amplifier 18 which limits amplitudes in the vicinity of between 30 and 40 IRE units. An output from the second limiting amplifier 18 is connected through a delay matching circuit 20 to a subtractor circuit 22 to which it is connected as a subtrahend input. The subtractor circuit 22 may be implemented as a differential amplifier or a functionally equivalent circuit. The output from the second limiting amplifier 18 at high level (waveform E') essentially models the output from the shaper 16 at high levels (waveform D') so that when the waveform E signal is substracted from signal D in the subtractor 22, an output 23 of the subtractor is essentially zero (waveform F'). At low signal levels, the output of the second limiting amplifier 18 (waveform E") will be much lower than the output from the shaper 16 (waveform D") and in the subtraction process, the output (waveform F") will substantially model the output of the shaper (waveform D").

The output line 23 from the subtractor 22 is connected through a level adjustment attenuator 27 to one input of a summing circuit 24 which is in a main signal path 25. The summing circuit 24 adds the nonlinear yet axially symmetrical signal complement (waveform F") to the main path signal in correct time relationship for low level signals (waveform G"). At high levels, the output of the summing circuit 24 (waveform G') essentially models the input signal (waveform A').

The transfer characteristics of the booster 10 are shown in the graphs set forth in FIG. 3. Therein, graph (a) depicts output amplitube as a function of input amplitude on bidimensional scales. The solid line represents the output (waveform C) of the first limiting amplifier 14. As can be seen, the output is linear for the first 10 IRE units of input amplitude. Thereafter, the output is limited to about 40 IRE units. The broken line in graph (a) of FIG. 3 represents the output of the second limiting amplifier 18 (waveform E), which shows linear amplification to about 40 IRE units of input amplitude and limiting thereabove.

The FIG. 3 (b) graph shows the transfer function of the subtractor circuit 22; it is linear for input amplitudes up to about 10 IRE units and linearly negative in the vertical, output amplitude dimension for amplitudes above 10 IRE units and below 40 IRE units. For input amplitudes above 40 IRE units, the output amplitude of the subtractor 22 is zero.

The transfer characteristic of the summing circuit 24 is illustrated by the FIG. 3(c) graph wherein the interrupted line depicts no distortion of the main path signal and essentially represents the condition of the main path without any operation of the low level signal booster 10. The broken line in FIG. 3(c) illustrates an average boost setting for the low level signal booster and the solid line represents the maximum boost. As shown by the graph of FIG. 3(c), the modification of the transfer characteristic of the summing circuit 24 in the region from zero to forty IRE units of input signal is nonlinear. The transfer characteristic has two distinct components, by virtue of the two limiting amplifiers 14 and 18. In the first component, the gain is substantially enhanced up to about the first ten IRE units of input. Thereafter, gain falls off very rapidly in the range from 10 to 40 IRE units. Above 40 IRE units, gain increases in a linear fashion. While selection of limiting thresholds of 10 IRE units for the first limiting amplifier 14 and 30 to 40 IRE units for the second limiting amplifier 18 has been somewhat arbitrarily made, those thresholds have been found to work well in practice, with very pleasing subjective improvement in picture quality.

One particularly useful application of the present invention is in connection with processing color television signals. In FIG. 4, a system 100 is provided in a color video path prior to video recording or transmission through a noisy medium. The system 100 includes a color video signal input 102, a luminance separating filter 104 connected to the input 102, a low level expansion circuit 106 of the type described in connection with FIG. 1 hereof (with the exception of the summing circuit 24), an adder circuit 108, and a delay matching circuit 110. The delay matching circuit 110 is inserted in a linear path 112 extending from the input 102 to the adder circuit 108. The luminance separating filter 104 may be any filter suitable for the purpose. Ringing is to be avoided. In PAL or NTSC color video formats, a comb filter works very well. See, e.g., applicant's co-pending U.S. patent application, Ser. No. 886,164, now U.S. Pat. No. 4,179,705, issued Dec. 18, 1979, more particularly referred to hereinafter.

The delay matching circuit 110 functions to delay the signals on the main path 112. The delay is selected so that the output from the low level expansion circuit 106 (waveform F', F'' of FIG. 2) is combined in the adder circuit 108 in proper time relationship with low level signals on the main path 112. An output 114 from the adder circuit 108 provides a low level signal offset to a predetermined amplitude threshold in accordance with the principles of the present invention (waveform G of FIG. 2).

Figure 5:
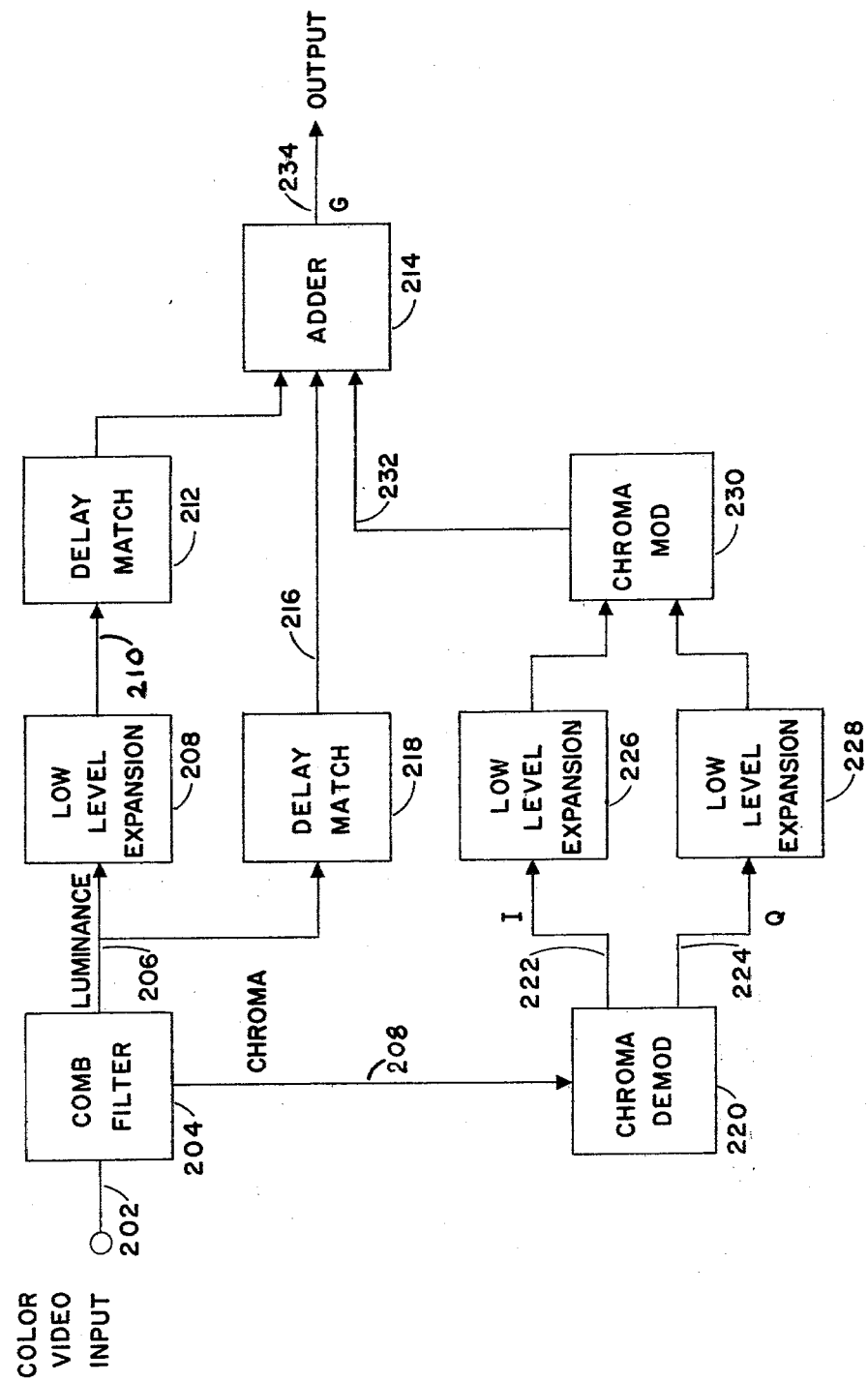
FIG. 5 is a block diagram of a color television processing system including separate low level signal boosters for luminance processing and for chrominance processing.

A low level signal booster for boosting chrominance as well as luminance components of a color video signal is set forth in FIG. 5. Therein, a system 200 includes a color composite video input 202, a comb filter 204 connected thereto providing a separated luminance output 206 and a separated chrominance output 208. The comb filter 204 may be of the types described in this applicant's U.S. Pat. No. 4,179,705, for "Method and Apparatus for Separation of Chrominance and Luminance with Adaptive Comb Filtering in a Quadrature Modulated Color Television System," reference to which is made for further details. The luminance output 206 is provided to a low level expansion circuit 208 of the type 10 set forth in FIG. 1 hereinabove omitting only the summing circuit 24. An output 210 from the low level expansion circuit 208 is passed through a delay matching network 212 to the input of the three input adding circuit 214.

Luminance information is provided directly to the adding circuit 214 via a line 216 which is connected to the luminance output 206 of the comb filter through a suitable delay matching network 218 which functions to provide linear main path luminance information to the adding circuit 214 in proper time relationship so that there are no group delay errors to hinder the combination of singles in the adding circuit 214.

The chrominance output 208 from the comb filter 204 is provided as an input to a chroma demodulator 220 wherein I and Q color subcarriers are separated from composite chroma for separate processing. Thus, the chroma demodulator provides an I subcarrier output 222 and a Q subcarrier output 224. The I subcarrier output 222 is passed through a low level expansion circuit 226 which is essentially the same as that described in connection with FIG. 1. Likewise, the Q subcarrier output 224 is connected to a low level expansion circuit 228 complementary with the circuit 226. Low level signal boosted I and Q outputs from the circuits 226 and 228, respectively, are supplied as inputs to a chroma modulator circit 230 which recombines the I and Q subcarriers into a composite chroma signal and puts a low level signal boosted chrominance signal out via a line 232 to a third input of the adding circuit 214. An output 234 of the adding circuit 214 provides a color composite signal wherein low level signals have been offset by a predetermined amplitude threshold in accordance with the principles of the present invention, as shown in waveform G" in FIG. 2.

Figure 6:
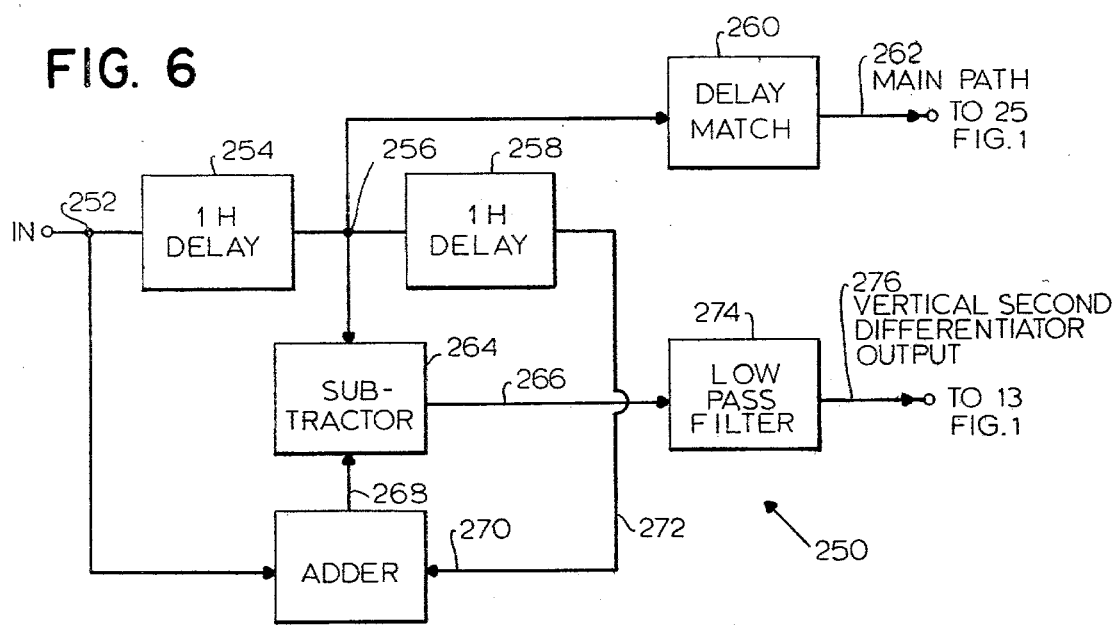
FIG. 6 is a block diagram of a vertical transition detector which may be used in lieu of the second differentiator so that the FIG. 1 booster operates in the vertical domain.

A vertical transition detector circuit 250, presented in FIG. 6, provides the same function for processing transitions occurring in the vertical dimension as does the second differentiator 12 of FIG. 1 for transitions occurring in the horizontal dimension. Delay elements 254 and 258, connected in tandem, are each equal to one television scanning line period (63.555 μs in the NTSC system, 64 μs in PAL and SECAM systems).

An output 256 from the first delay 254 connects not only to the second delay 258, but also to a delay matching circuit 260 having an output 262 which would be connected to the main path 25 input to the adder 24 in FIG. 1. The line 256 is also connected to an input of a subtractor 264. The subtractor 264 has another input 268 from an adder 270 which has one input from the detector input 252 and another from an output 272 of the second delay 258. An output from the subtractor 264 is passed through a low pass filter 274 to provide a filtered second differentiator vertical transition output 276 which would be connected to the line 13 in FIG. 1. Thus, the vertical detector would replace the horizontal transition second differentiator 12 in the booster 10 of FIG. 1 to provide a booster for low level vertical domain transitions.

The combination of elements 254, 258, 264 and 270 provide an electrical equivalent to a vertical dimension second differentiator whose output 266 has a signal only when there is a change of signal amplitude in the vertical direction and whose shape would be identical to waveforms B (FIG. 2) on a larger, vertical dimension time scale. The low pass filter 274 has a 3 db cut off at 2 MHz (NTSC) or 2.5 MHz (PAL); and, its function is to eliminate chroma components from the vertical differentiation output signal. Delay matching block 260 delays the main path to match the delay introduced by filter 274 in the correction path. Futher signal processing is identical to FIG. 1 processing following its second differentiator 12 and the waveforms of FIGS. 2 and 3 apply equally well (remembering that the time scale would be appropriate to vertical transitions). Systems shown and described in the block diagram of FIGS. 4 and 5, above, apply equally well in the case of vertical differentiation.

Figure 7:
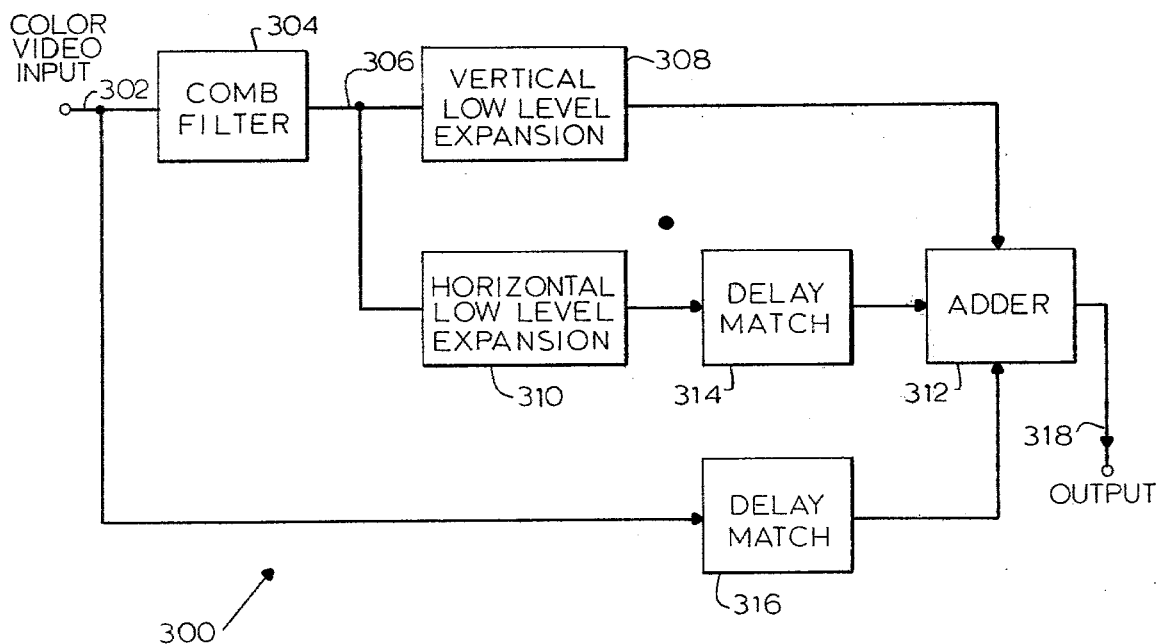
FIG. 7 is a block diagram of a low level transition signal processing system in accordance with the present invention which functions simultaneously in the horizontal and vertical dimensions.

Horizontal and vertical low transition level expansion may be combined for improved results as shown in the system 300 in FIG. 7. Therein, a color video input 302 is passed through a comb filter 304. An output 306 of the filter 304 is passed through a vertical dimension low level transition booster 308 (FIGS. 1 and 6) and also a horizontal dimension low level transition booster 310 (booster 10 of FIG. 1). An adder 312, connected to the input via a delay match circuit 316, the vertical booster 308, and the horizontal booster 310 (through another delay match circuit 314) provides a boosted transition signal output 318.

The processed signal at the output 318 may be then passed through a low level transition attenuative medium (whether vertical, horizontal or both) with virtually no loss of resolution, no added pictorial artifacts and with significant noise reduction.

To those skilled in the art to which this invention relates, many changes in construction and widely differing embodiments will suggest themselves without departing from the spirit and scope of the invention. The disclosures and the description herein are purely illustrative and are not intended to be in any sense limiting.

I claim:

1. In a television system, a low transition level signal booster for offsetting low transition level video transitions occurring throughout the gray scale by a predetermined amplitude level, said low level transition signal booster comprising a linear signal path from an input to an output and low transition level signal expansion circuit means connected in parallel therewith, for generating and adding to said linear signal path a nonlinear axially symmetrical signal complement which, when combined in proper time relationship with the low transition level video signal below a predetermined level on said path, increases the instantaneous amplitude generally by the amount corresponding to said level, said signal complement being generated from said low transition level video signal but not for video transition signals above said level, so that said low transition level signal expansion circuit means is inoperative for video transition signals initially above said level.

2. The low transition level signal booster set forth in claim 1 and being operative for low level transitions in the horizontal dimension, wherein said low transition level signal expansion circuit means comprises:
second differential processor means connected to said input for putting out a signal generally corresponding to the second differential of horizontal transitions in the video signal at said input;
first limiting amplifier means connected to said second differential processor means for linearly amplifying said second differential to a first preselected low level threshold and limiting amplitude thereabove;
filter means connected to said limiting amplifier means for wave shaping the amplitude limited output of said first limiting amplifier means and reducing high frequency harmonics content therein;
second limiting amplifier means connected to said second differential processor means for linearly amplifying said second differential to a second preselected level threshold above said first level threshold and generally corresponding to said pedestal amplitude, and limiting amplitude thereabove;
subtractor means connected to subtract the wave shaped output of said first limiting amplifier means from the in time output of said second limiting amplifier means to provide said signal complement.

3. The low transition level signal booster set forth in claim 1 and being operative for low level transitions in the vertical dimension, wherein said low transition level signal expansion circuit comprises:
vertical transition detector means for putting out a signal generally corresponding to the second differential of vertical transitions in the video signal at said input;
first limiting amplifier means connected to said vertical transitions detector means for linearly amplifying said vertical transition second differential to a first preselected low level threshold and limiting amplitude thereabove;
filter means connected to said limiting amplifier means for wave shaping the amplitude limited output of said first limiting amplifier means and reducing high frequency harmonics content therein;
second limiting amplifier means connected to said vertical transition detector means for linearly amplifying said vertical transition second differential to a second preselected level threshold above said first level threshold and generally corresponding to said pedestal amplitude, and limiting apmlitude thereabove;
subtractor means connected to subtract the wave shaped output of said first limiting amplifier means from the in time output of said second limiting amplifier means to provide said signal complement.

4. The low transition level signal booster set forth in claim 2 or claim 3 wherein said first limiting amplifier means is adjusted to limit at about 10 IRE units of video amplitude, and said second limiting amplifier means is adjusted to limit at about 40 IRE units of video amplitude.

5. The low transition level signal booster set forth in claim 1 included within a color television system following NTSC, PAL and similar encoding schemes, said color television system including luminance separation means for separating luminance from composite color video and supplying said separated luminance as input to said low level signal booster, said linear signal path carrying said composite color video and including delay matching means for matching the delays through said linear signal path and said parallel low level signal expansion circuit.

6. In a color television system encoded in accordance with NTSC, PAL and similar signal formats, a low transition level video signal booster for offsetting low transition level composite color video signals by a predetermined amplitude level, said low transition level video signal booster comprising:
comb filter means connected to an input for separating luminance from composite color video at said input;
low level signal expansion circuit means connected to receive said separated luminance, for generating and putting out a nonlinear, axially symmetrical transition signal complement which when combined in proper time relationship with low transition level video below said predetermined level increases the instantaneous amplitude generally by an amount corresponding to said level, said signal complement being generated from low transition level signals present in said separated luminance, but not being generated for luminance transition signals above said level;

a linear signal path from the input of said low level video signal booster;

delay matching means for equalizing delay of the path through said comb filter means and said low transition level signal expansion circuit means with the linear signal path;

combiner means for combining in proper time relationship said transition signal complement generated by said low transition level signal expansion circuit means with the signal in said linear signal path so that transition signals initially below said predetermined amplitude level are offset generally by the amount of said level whereas transition signals above said level retain their original relative amplitude.

7. In a color television system encoded in accordance with NTSC, PAL and similar signal formats, a low level video signal booster for offsetting low transition level composite color video signals by a predetermined amplitude level, said low transition level video signal booster comprising:

(a) an input;

(b) comb filter means connected to said input for separating and putting out luminance and chrominance signal components of said color signal;

(c) first low level signal expansion circuit means connected to receive said separated luminance, for generating and putting out a first nonlinear, axially symmetrical signal complement which when combined in proper time relationship with low level video below said level increases the instantaneous amplitude generally by an amount corresponding to said level, said signal complement being generated from low transition level signals present in said separated luminance, but not being generated for luminance transition signals above said level;

(d) chroma demodulator means connected to receive said separated chrominance, for demodulating said chroma into subparts; (e) second low transition level signal expansion circuit means functionally equivalent to said first expansion circuit means and connected to receive one of said chroma subparts, for generating and putting out a second nonlinear signal complement from low transition level signals present in said one of the chroma subparts;

(f) third low transition level signal expansion circuit means functionally equivalent to said first expansion circuit means and connected to receive another of said chroma subparts, for generating and putting out a third nonlinear signal complement from low transition level signals present in said another of the chroma subparts;

(g) chroma modulator means connected to at least the outputs of said second and third expansion circuit means for reconstituting said chroma signal;

(h) a linear path from the separated luminance output of said comb filter means;

(i) delay matching means for equalizing timing of signals passing through said first, second and third expansion circuit means and through said linear path;

(j) combiner circuit means connected to the output of said first expansion circuit means, said linear path and said chroma modulator means in proper time relationship for providing a color composite video signal wherein low transition level signals have been offset above said predetermined amplitude level.

8. In a television system a low transition level signal booster for boosting low transition level video signals by a predetermined amplitude pedestal, said booster comprising:

an input;

a linear signal path connected to said input;

a low transition level signal expansion circuit connected to said input, said circuit including second differential transition processor means connected to said input for putting out a signal generally corresponding to the second differential of the video transition signal at said input;

first limiting amplifier means connected to said second differential processor means for linearly amplifying said second differential to a first preselected low level threshold and limiting thereabove;

filter means connected to said limiting amplifier means for wave shaping the amplitude limited output of said first limiting amplifier means and reducing its high frequency harmonics content;

second limiting amplifier means connected to said second differential processor means for linearly amplifying said second differential to a second preselected threshold above said first level and generally corresponding to said pedestal amplitude and limiting thereabove;

subtractor means connected to subtract the wave shaped output of said first limiting amplifier means from the output of said second limiting amplifier to provide a signal complement;

adder means connected to add from said main signal path and said low level signal expansion circuit to provide as an output a sum wherein said low transition level television signals are offset by said pedestal offset signal, and transition signals initially above said pedestal are substantially unaffected by the operation of said booster.

9. A bidimensional low transition level signal booster for boosting low transitions level color video signals in the horizontal direction and in the vertical direction simultaneously, said bidimensional booster comprising:

a color video input;

comb filtering means connected to said input for separating luminance and chrominance signal components, vertical low transition level booster circuit means connected to said comb filtering means for boosting low level transitions in the vertical domain within the luminance component;

horizontal low transition level booster circuit means connected to said comb filtering means for boosting low level transitions in the horizontal domain with respect to the luminance components;

combiner means for combining in proper time delayed relationships and amplitudes the video input, the output from the vertical booster circuit and the output from the horizontal booster circuit.

10. A bidimensional low transition level signal booster for boosting low transition level color video signals in the horizontal direction and in the vertical direction simultaneously, said bidimensional booster comprising:

a color video input;

comb filtering means connected to said input for separating luminance and chrominance signal components;

vertical low transition level booster circuit means connected to said comb filtering means for boosting low level transitions in the vertical domain within the luminance component;

horizontal low transition level booster circuit means connected to said comb filtering means for boosting low level transitions in the horizontal domain separately with respect to the luminance component and the separated chrominance component;

combiner means for combining in proper time delayed relationships and amplitudes the video input, the output from the vertical booster circuit and the output from the horizontal booster circuit.

* * * * *